United States Patent Office 2,835,705
Patented May 20, 1958

2,835,705
PRODUCTION OF AMINES

Sidney Arthur Lamb and Stanley Ward, Norton-on-Tees, England, assignors to Imperial Chemical Industries Limited, London, England, a corporation of Great Britain No Drawing. Application April 4, 1956
Serial No. 575,965

Claims priority, application Great Britain
January 22, 1951

11 Claims. (Cl. 260—576)

This invention relates to aromatic diamines.

The present application is a continuation-in-part of our co-pending application Serial No. 264,672, filed January 2, 1952 and now abandoned.

According to the present invention there is provided in a continuous process for the production of an alkylated aromatic diamine selected from the group consisting of phenylene diamine and amino-diphenylamine by the reductive alkylation of an aromatic compound having two nitrogen-containing groups selected from amino-, nitro- and nitroso-radicles which is selected from benzene containing two such groups and diphenylamine containing one such group additional to the amino group, at superatmospheric pressure and temperature with methyl ethyl ketone, the improvement comprising recycling from the product an aqueous distillation cut comprising the water/ketone azeotrope, dissolving in said aqueous distillation cut the nitrogen containing organic compound employed as starting material thereby obtaining a solution substantially free from water and returning said solution to the main reaction zone.

That water can be introduced into the system in this way without adversely affecting the reaction is surprising since it would not be expected by one skilled in the art on the basis of the law of mass action. By recycling such a cut there is provided a medium for dissolving the nitrogen containing compound, which dissolves in the ketone and displaces water from the azeotropic mixture. Economies are achieved in this way. The water layer which forms can be discarded.

The main process may be conducted in the liquid or vapour phase employing nitro-compounds, as described for example in co-pending application Serial No. 575,964 of S. A. Lamb, S. Ward and M. A. E. Hodgson filed January 22, 1951, or in a two-stage process in which a mono- or dinitro-compound is reacted with hydrogen in a first stage to yield amine and this amine is in a second stage reacted with ketone and hydrogen to give the desired product.

Preferably the reductive alkylation is operated in continuous manner, more preferably in the liquid phase.

The process is applicable to the production, for example, of alkylated para, meta- or orthophenylene diamines from the corresponding dinitro, nitro-amino, or di-amino compounds. It is also applicable to the production of 4-sec.-butylamino-diphenylamine from a diphenylamine substituted in the 4-position by a nitrogen containing radicle, which advantageously is the nitroso compound because of its ready availability. These compounds, especially 4-sec.-butylamino-diphenylamine are valuable as antioxidants e. g. for petrol and aldehydes.

Operating in the liquid phase in continuous manner, which is the preferred method, the reductive alkylation may be conducted, for example, at a temperature of 100° to 180° C. and pressure of 10 to 300 atmospheres gauge using a hydrogenating catalyst, especially a copper containing catalyst.

Preferably, the para-nitro-amine is used for the production of the NN'-di-alkylated para-phenylene diamines, and the metal-dinitro compound for the production of the NN'-di-alkylated meta-phenylene diamines. Thus the process may be applied to the production of NN'-di-sec-butyl para-phenylene diamine from para-nitraniline, methyl ethyl ketone and hydrogen; and to the production of NN'-di-sec-butyl meta-phenylene diamine from meta-dinitrobenzene, methyl ethyl ketone and hydrogen.

Suitable catalyst are copper-on-chromia, copper-on-zinc oxide, copper-on-alumina, copper-on-kieselguhr, copper-on mullite. Preferably pelleted catalysts are employed, more preferably pelleted copper-on-chromia and copper-on-zinc-oxide.

The process of the invention is illustrated by the following examples.

Example 1

250 grams of para-nitraniline was dissolved in 600 grams of methyl ethyl ketone-water azeotrope; the water layer which formed was removed; and the other layer was reacted with hydrogen in the presence of a platinum-on-charcoal (5% pt. by weight) catalyst under the following reaction conditions. The temperature was maintained at 100° C. under from 40 to 50 atmospheres gauge for one hour, after which the temperature was raised to 160° C. and maintained thereat under the same pressure for a further 8 hours. The molar yield of NN'-di-sec-butyl para-phenylene diamine was about 100%.

Example 2

Fresh feed for the reductive alkylation process was made by dissolving 1 kg. mole of para-nitraniline in 6 kg. moles of methyl ethyl ketone in the form of its water azeotrope. There was complete solution of the para-nitraniline and a water layer separated. The latter was run off and the top layer was diluted with 6 times its weight of recycled material and thereafter treated in the following manner.

4.2 litres per hour of this mixture was fed together with hydrogen in a gas/liquid volume ratio of 75:1, measured at N. T. P. in co-current upward flow through 1 litre of $\frac{3}{16}$" reduced copper chromite pellets contained in a 5' long x 1.25" diameter tube, the pressure being 50 atmospheres gauge, the inlet temperature 110° C. and the maximum temperature 180° C.

The product, which contained some methyl ethyl ketone, secondary butanol and water, and substantially no para-nitraniline or para-phenylene diamine, yielded on fractional distillation NN'-di-sec-butyl para-phenylene di-amine in almost 100% molar yield calculated on the para-nitraniline fed.

We claim:

1. In a continuous process for the production of an alkylated aromatic diamine selected from the group consisting of phenylenediamine and amino-diphenylamine by the reductive alkylation of an aromatic compound having two nitrogen-containing groups selected from the group consisting of amino-, nitro- and nitroso-radicles which is selected from benzene containing two such groups and diphenylamine containing one such group additional to the amino group, said nitrogen containing groups being the sole substituents of said aromatic compound at superatmospheric pressure and temperature with methyl ethyl ketone, the improvement comprising recycling from the product an aqueous distillation cut comprising the water/ketone azeotrope, dissolving in said aqueous distillation cut the nitrogen containing organic compound employed as starting material thereby obtaining a solution substantially free from water and returning said solution to the main reaction zone.

2. A process as claimed in claim 1 characterised in that the said nitrogen organic compound is dissolved in the aqueous distillation cut, the water layer which separates is removed, and the solution of compound in ketone is employed as starting material in the process.

3. A process as claimed in claim 1 when operated in continuous manner, the azeotrope being recycled continuously.

4. A process as claimed in claim 3 when operated in continuous manner, the azeotrope being recycled continuously.

5. The process as claimed in claim 1 for the production of NN'-di-sec-butyl-para-phenylene diamine by the reductive alkylation of para-nitraniline with methyl ethyl ketone.

6. The process as claimed in claim 1 for the production of NN'-di-sec-butyl-meta-phenylene diamine by the reductive alkylation of meta-di-nitro-benzene with methyl ethyl ketone.

7. The process as claimed in claim 1 for the production of 4-sec-butylamino-diphenylamine by the reductive alkylation of 4-nitroso-diphenylamine with methyl ethyl ketone.

8. The process as claimed in claim 1 for the production of 4-sec-butylamino-diphenylamine by the reductive alkylation of diphenylamine substituted in the 4-position by a nitrogen containing group selected from nitro- and amino-radicles.

9. In a continuous process for the production of alkylated phenylenediamine by the reductive alkylation of diamino benzene containing said amino groups as the sole substituents at superatmospheric pressure and at elevated temperature with methyl ethyl ketone, the improvement therein comprising recycling from the product an aqueous distillation cut comprising the water/ketone azeotrope, dissolving in said aqueous distillation cut the diamino benzene employed as starting material thereby obtaining a solution substantially free from water and returning said solution to the main reaction zone.

10. In a continuous process for the production of alkylated phenylenediamine by the reductive alkylation of dinitrobenzene containing said nitro groups as the sole substituents at superatmospheric pressure and at elevated temperature with methyl ethyl ketone, the improvement therein comprising recycling from the product an aqueous distillation cut comprising the water/ketone azeotrope, dissolving in said aqueous distillation cut the dinitro benzene employed as starting material thereby obtaining a solution substantially free from water and returning said solution to the main reaction zone.

11. In a continuous process for the production of alkylated phenylenediamine by the reductive alkylation of mono-nitro mono-amino benzene containing said nitro and amino groups as the sole substituents at superatmospheric pressure and at elevated temperature with methyl ethyl ketone, the improvement therein comprising recycling from the product an aqueous distillation cut comprising the water/ketone azeotrope, dissolving in said aqueous distillation cut the mono-nitro mono-amino benzene employed as starting material thereby obtaining a solution substantially free from water and returning said solution to the main reaction zone.

References Cited in the file of this patent

UNITED STATES PATENTS

| | | |
|---|---|---|
| 1,978,433 | Major | Oct. 30, 1934 |
| 2,045,574 | Adkins | June 30, 1936 |
| 2,090,652 | Von Bramer et al. | Aug. 24, 1937 |
| 2,140,694 | Evans | Dec. 20, 1938 |
| 2,298,284 | Emerson | Oct. 13, 1942 |
| 2,323,948 | Von Bramer et al. | July 13, 1943 |
| 2,381,015 | Von Bramer et al. | Aug. 7, 1945 |
| 2,432,552 | Williams et al. | Dec. 16, 1947 |
| 2,533,723 | Dombrow | Dec. 12, 1950 |